United States Patent [19]

Jackson

[11] 4,098,230

[45] Jul. 4, 1978

[54] AQUARIUM

[76] Inventor: Arthur A. Jackson, 11605 Manchester, Grandview, Mo. 64134

[21] Appl. No.: 727,954

[22] Filed: Sep. 29, 1976

[51] Int. Cl.² .......................................... A01K 63/00
[52] U.S. Cl. ........................................ 119/5; 119/3; 210/169
[58] Field of Search ................ 119/3, 5; 210/169; D30/6–12

[56] References Cited

U.S. PATENT DOCUMENTS

| | | | |
|---|---|---|---|
| 2,935,199 | 5/1960 | Willinger | 210/169 |
| 3,294,239 | 12/1966 | Dayes | 119/5 |
| 3,324,829 | 6/1967 | De Jose et al. | D30/8 X |
| 3,418,973 | 12/1968 | Saito | 119/5 |
| 3,472,381 | 10/1969 | Halpert | 119/5 |
| 3,490,416 | 1/1970 | Kelley | 119/5 |
| 3,720,319 | 3/1973 | White | 210/169 |
| 3,722,685 | 3/1973 | Orensten et al. | 210/169 |
| 3,855,970 | 12/1974 | Harwood | 119/5 |
| 3,867,292 | 2/1975 | Cornell | 210/169 |
| 3,892,199 | 7/1975 | Huyler | 119/5 |
| 3,971,338 | 7/1976 | Alexson | 119/5 |
| 4,002,566 | 1/1977 | Smith | 210/169 |
| 4,035,298 | 7/1977 | Cloke et al. | 210/169 |

*Primary Examiner*—Clyde I. Coughenour
*Attorney, Agent, or Firm*—Fishburn, Gold & Litman

[57] ABSTRACT

An aquarium having an aquarium bed, such as gravel, within an aquarium tank defined by a bottom wall and side and end walls and a drain and filter structure therefor. The aquarium includes means for continuous filtration and aeration and including air moving means. The aquarium drain and filter structure includes the bed and sub-bed filter means including a support member within the aquarium tank and positioned to define a lower water receiving compartment having communication with a drain and to provide a support for a plurality of drain members each having a flow passage therethrough. A foraminous member is in overlying relation with the drain members and supports the aquarium bed thereon. The structure also includes a power filter, controls, and ducts for selectively moving water and debris from the lower water receiving compartment and through the filter all being operative to remove debris therefrom and to return filtered water to the aquarium tank.

3 Claims, 3 Drawing Figures

AQUARIUM

The present invention relates to aquariums and more particularly to an aquarium bed support, drain, and filter structure operative to remove debris from drain water and to return filtered water to an aquarium tank surface.

It is common practice to periodically change the water in an aquarium to remove dissolved organic waste matter, debris, and the like. In small aquariums the cleaning may be performed by removing the aquatic life from the tank and then emptying the tank, cleaning same, filling the tank with conditioned water and then returning the aquatic life to the tank. Such changing is not only laborious it can injure the aquatic life and this would be particularly true in changing water in large aquariums.

The principal objects of the present invention are: to provide an aquarium bed, drain, and filter structure which substantially eliminates the emptying of aquariums to clean same and maintain conditions for supporting aquatic life; to provide such an aquarium structure capable of removing debris from drain water and returning filtered water to the aquarium tank; to provide such an aquarium structure having an underbed filter structure defining a drain water receiving compartment; to provide such a structure including means for continuous filtration and aeration of aquarium water and the aquarium bed; to provide such an aquarium structure using flow means communicating with a lower water receiving compartment and with a filter capable of removing debris from aquarium water; to provide such an aquarium structure wherein aerobic bacteria are effective to break down debris or waste particles into harmless compounds; to provide such an aquarium structure effective to substantially eliminate the requirement for frequent changes of water within an aquarium; and to provide such an aquarium structure which is economical to manufacture, durable in construction, positive in operation, attractive in appearance, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the aquarium drain and filter structure.

Figure 1:
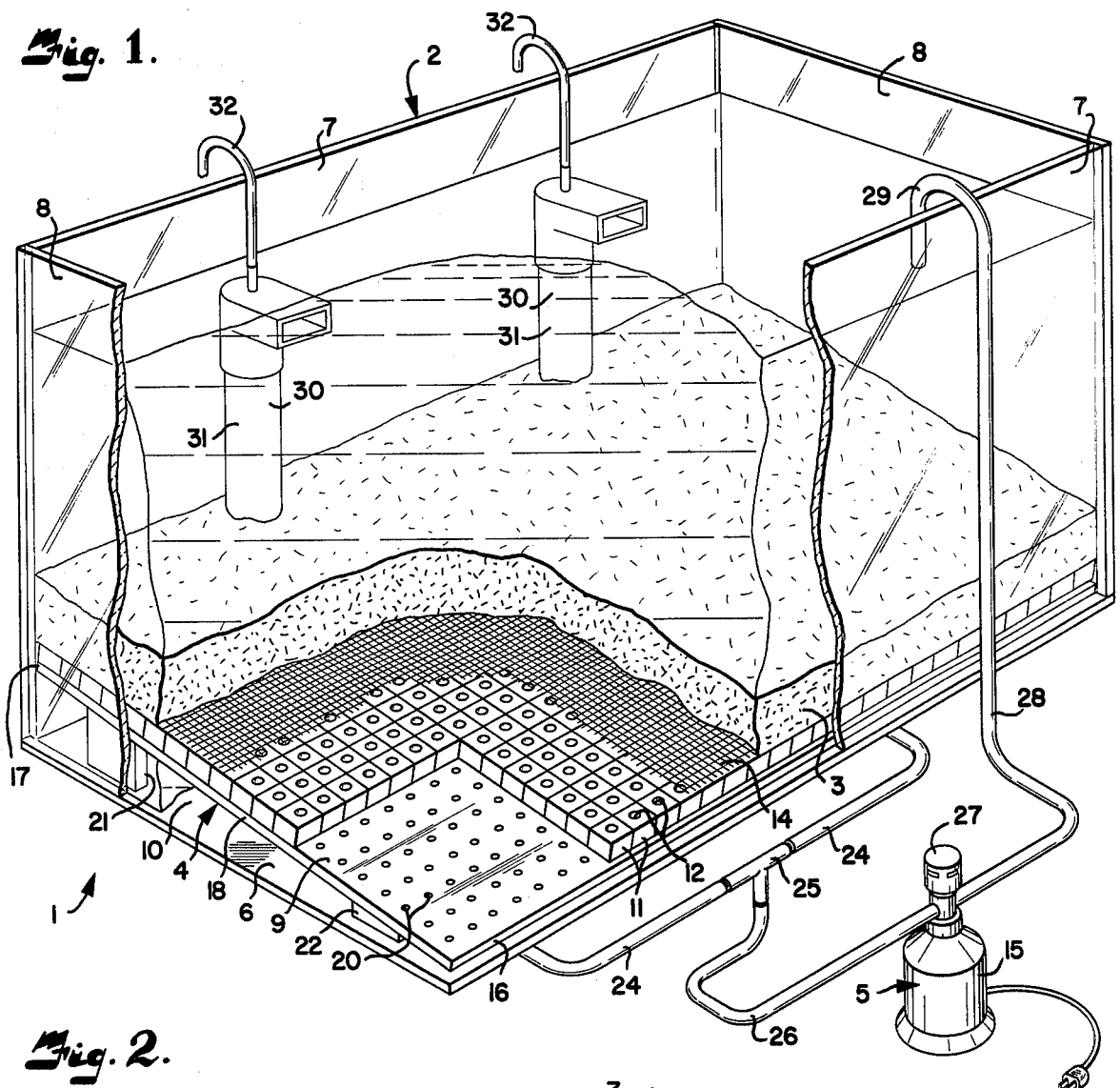
FIG. 1 is a perspective view of an aquarium with portions broken away to illustrate an aquarium bed, drain and filter structure embodying features of the present invention.
Figure 2:
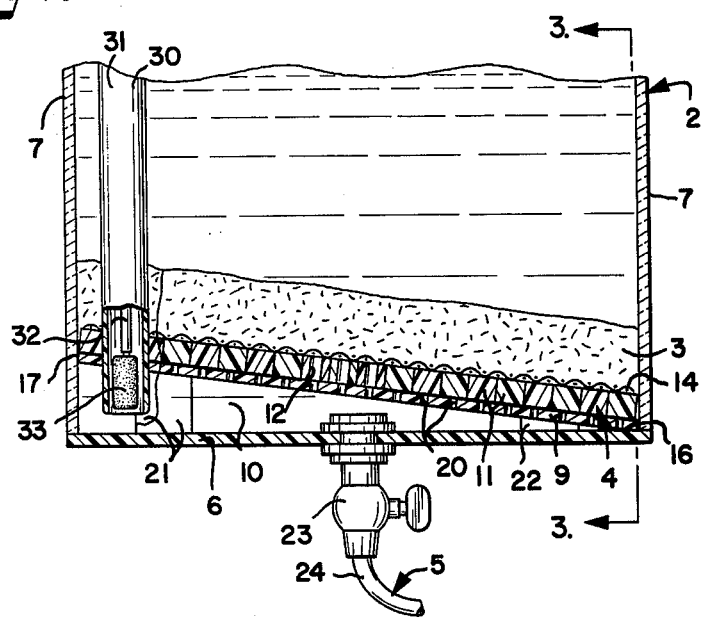
FIG. 2 is a fragmentary transverse sectional view through the aquarium.
Figure 3:
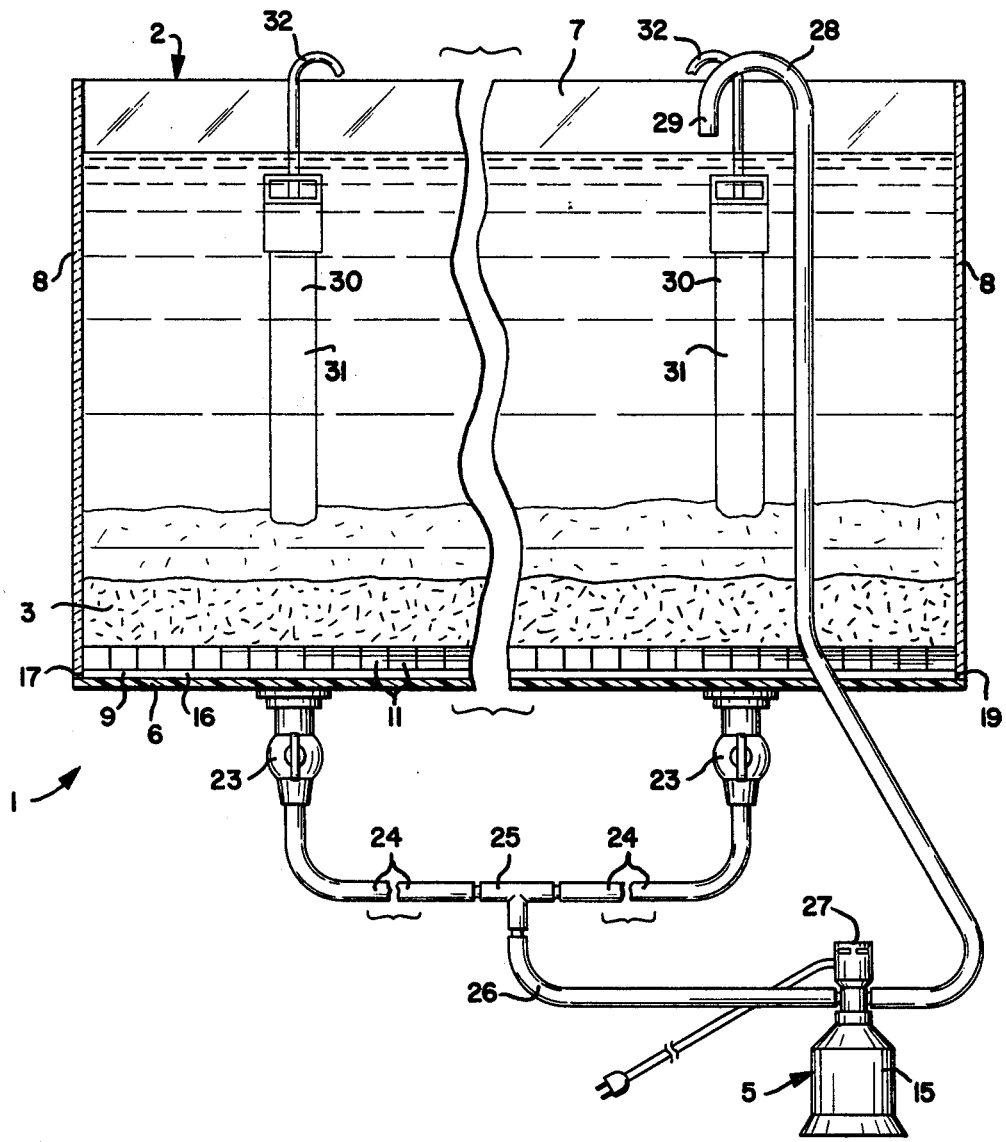
FIG. 3 is a longitudinal sectional view taken on line 3—3 of FIG. 2 and illustrating the aquarium and the filter components.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates an aquarium structure having a tank 2 with a bed 3 on a drain and support structure 4 and a water circulating and filter system 5 that selectively moves water from a lower compartment in the tank 2 under the bed support. The water is moved through a filter that removes debris and conditions the water which is then returned to the tank. This cleaning and conditioning the water maintains the aquarium for use and substantially reduces the emptying and changing of the water. The aquarium tank 2 is defined by a bottom wall 6 and side and end walls 7 and 8 respectively. The aquarium 1 includes means for continuous filtration and aeration of aquarium water and the aquarium bed 3. The aquarium drain and filter structure 5 is effective to substantially reduce the requirement of frequent changes of water within an aquarium.

The aquarium structure 1 includes a support member 9 within the aquarium tank 2 and positioned to define a water receiving compartment 10 and a support for a plurality of drain members 11 each having a flow passage 12 therethrough. A foraminous member 14 is in overlying relation with the drain members 11 and supports the aquarium bed 3 thereon. A filter 15 receives drain water and debris from the water receiving compartment 10 and is operative to remove debris therefrom and to return filtered water to the aquarium tank 2.

The aquarium tank 2 may be any suitable structure and may be any desired shape. The illustrated aquarium tank 2 is rectangular and the bottom wall 6 is substantially horizontal with the side and end walls 7 and 8 respectively extending upwardly from the bottom wall 6. The walls of the tank 2 are connected together in any suitable manner to provide a water-tight structure.

The illustrated support member 9 is a planar member positioned within the tank 2 and the support member 9 has opposite side edges 16 and 17 and opposite end edges 18 and 19. The support member 9 has a plurality of longitudinally and laterally spaced apertures 20 therein for flow of water and debris therethrough and into the lower water receiving compartment 10.

The aquarium tank 2 has means therein for positioning the support member 9 above the bottom wall 6 of the tank 2 thereby defining the lower water receiving compartment 10 between the bottom wall 6 and the support member 9. One of the side edges, for example side edge 16 of the support member 9, is positioned adjacent or in engagement with the bottom wall 6 and one of the side walls 7 of the aquarium tank 2. The other support member side edge 17 is positioned above the tank bottom wall 6 and adjacent or in engagement with the other side wall 7 of the aquarium tank 2.

In the illustrated embodiment, a plurality of longitudinally spaced first posts 21 and a plurality of second posts 22 are mounted on the bottom wall 6 of the aquarium tank 2. The first posts 21 are longer or taller than the second posts 22 whereby the support member 9 is inclined toward the bottom wall 6 and toward one of the side walls 7 of the aquarium tank 2.

The aquarium structure 1 includes drain means between the support member 9 and the aquarium bed 3 and having a plurality of flow passages therethrough for flow of water and debris toward and through the support member 9. The drain means is supported on the support member 9 and the drain means supports the aquarium bed 3.

The illustrated drain means includes the drain members 11 which are illustrated as a plurality of glass or plastic cubes each having one flow passage 12 therethrough. Each of the cubes has at least one adjacent cube in engagement therewith. The flow passages 12 of each drain member 11 has an inlet end at the upper surface of the cube and an outlet or discharge end at the lower surface of the cube. The lower surface of each drain member is in supported engagement with the support member 9. Each of the flow passages 12 is preferably above and aligned with a respective one of the apertures 20 through the support member 9.

The illustrated drain means also includes the foraminous member 14 overlying the drain members 11 and covering the inlet end of each of the flow passages 12 and for supporting the aquarium bed 3 thereon. The foraminous member 14 is preferably formed of a nonmetallic or plastic mesh which has openings smaller than the material forming the aquarium bed 3.

The aquarium structure 1 includes filter means selectively receiving water and debris from the lower water receiving compartment 10 for removing debris therefrom and for returning filtered water to the aquarium tank 2. In the illustrated embodiment, at least one and preferably a plurality of drain valves 23 are mounted on the bottom wall 6 of the aquarium tank 2 and communicate with the lower water receiving compartment 10. Flow members or ducts 24 each have one end thereof connected to and extend from a respective one of the drain valves 23. The other end of the flow members 24 are each connected to a junction or tee member 25 which is connected to the filter 15 by a flow member or duct 26.

The filter 15 receives water and debris from the flow member 26 and is capable of removing debris therefrom. The filter 15 preferably is a power filter and includes a pump 27 having the flow member 26 connected thereto and the pump 27 is operative to move the water and debris through the filter 15.

A return flow member or duct 28 has one end thereof connected to the pump 27 and the other or discharge end 29 positioned to direct filtered or conditioned water into the aquarium tank 2, as by extending over the upper edge of one of the aquarium tank walls.

The aquarium has means 30 for releasing air within the compartment 10 below the aquarium bed 3. The illustrated air releasing means 30 includes a plurality of tubular receptacles 31 positioned within the aquarium tank 2 and preferably supported on a rear one of the tank side walls 7. The tubular receptacles 31 each have an open upper end positioned below an upper surface of water within the aquarium tank 2. The tubular receptacles 31 each have an open lower end thereof preferably positioned below the support member 9 and within the lower water receiving compartment 10.

An elongated air tube 32 is positioned in each of the tubular receptacles 31 and each air tube 32 has one end thereof outwardly of the aquarium tank 2 and connected to a suitable air pump (not shown). Each air tube 32 has an air stone 33 mounted on the lower end thereof and positioned adjacent the open lower end of the respective tubular receptacle 31 so that air flowing outwardly from the air stones 33 flows into the lower water receiving compartment 10 which creates air bubbles which flow upwardly through the air tube 31 thereby supplying oxygen to the surface of the water in the tank and to aerobic bacteria within the aquarium bed 3. Flow of air bubbles upwardly through the air tube 3 effects a downwardly flow of aerated water through the aquarium bed 3, foraminous member 14, drain members 11, and the support member 9 and into the compartment 10. While air flow through the air tubes 32 and the air stones 33 continues and the drain valves 23 are closed, continuous aeration of the water within the aquarium tank 2 and filtration of aerated water through the aquarium bed 3 is effected. Aerated water and debris are thereby drawn downwardly into the aquarium bed 3 where the debris is retained and broken down by aerobic bacteria within the aquarium bed 3. Opening the drain valves 23 and operating the pump 27 also effects a downwardly flow of aerated water through the aquarium bed 3 and breakdown of debris within the aquarium bed 3.

It is to be understood that while I have illustrated and described one form of my invention, it is not to be limited to the specific form or arrangement of parts herein described and shown.

What I claim and desire to secure by Letters Patent is:

1. In an aquarium having an aquarium bed in the form of gravel within a water retaining tank defined by a bottom wall, and opposed side and end walls, an aquarium drain and filter structure including means for effecting substantially continuous filtration and aeration and comprising:
   (a) a planar support member positioned within an aquarium tank and having a plurality of apertures therein for flow of water and debris therethrough, said support member having opposite side and end edges:
   (b) means within the aquarium tank for positioning said support member above a bottom wall of the aquarium tank and with the support member end edges in engagement with the aquarium tank end walls and with one side edge in engagement with said bottom wall and one side wall of the aquarium tank and the other side edge of the support member positioned above the aquarium tank bottom wall thereby positioning said support member in inclined relation to said bottom wall and defining a lower water receiving compartment between the aquarium tank bottom wall and said support member, said lower water receiving compartment having its greatest height adjacent said other side wall;
   (c) a plurality of drain members above and in engagement with said support member and each in engagement with at least one adjacent drain member and each having at least one flow passage extending downwardly therethrough, each of the flow passages having an inlet end and an outlet end above said support member;
   (d) foraminous means overlying said drain members for covering the inlet end of each of said flow passages, said foraminous means having openings smaller than the particle size of the gravel forming the aquarium bed for supporting the aquarium bed on the foraminous means and permitting movement of water and debris therethrough toward the lower water receiving compartment;
   (e) means having passages communicating the area of greatest heighth of the water receiving compartment with the aquarium tank above said aquarium bed;
   (f) means communicating with said passages adjacent the water receiving compartment for discharging air bubbles and flow thereof toward an upper surface of water within the aquarium tank;
(g) at least one valve controlled flow member communicating with the lower water receiving compartment in spaced relation to said side and end walls for flow of drain water and debris therefrom; and
(h) a filter device having communication with said valve controlled flow member and capable of removing debris from aquarium water and including a pump means having said valve controlled flow member connected thereto for moving water and debris through said filter device and discharging said filtered water adjacent the upper surface of water within the aquarium tank.

2. In an aquarium having an aquarium bed in the form of gravel within a water retaining tank defined by a bottom wall, end walls, a front wall and a rear wall, an aquarium drain and filter structure including means for effecting substantially continuous filtration and aeration and comprising:
(a) a planar support member positioned within an aquarium tank and having a plurality of apertures therein for flow of water and debris therethrough, said support member having oppposite end, front and rear edges;
(b) means within the aquarium tank for positioning said support member above a bottom wall of the aquarium tank and with the support member end edges in engagement with the aquarium tank end walls and the front edge in engagement with said bottom wall and front wall of the aquarium tank and the rear edge of the support member positioned above the aquarium tank bottom wall thereby positioning said support member in inclined relation to said bottom wall and defining a lower water receiving compartment between the aquarium tank bottom wall and said support member said lower water receiving compartment having its greatest heighth adjacent said rear wall;
(c) a plurality of drain members above and in engagement with said support member and each in engagement with at least one adjacent drain member and each having at least one flow passage therethrough, each of the flow passages having an inlet end and an outlet end above said support member;
(d) foraminous means overlying said drain members for covering the inlet end of each of said flow passages and for supporting thereon the aquarium bed and permitting movement of water and debris therethrough toward the lower water receiving compartment;
(e) a plurality of tubular receptacles in the aquarium tank adjacent said rear wall and having open upper ends below the level of water in said tank and open lower ends between the bottom wall and support member;
(f) means communicating with said tubular receptacles within the aquarium tank and discharging air bubbles in said receptacles adjacent lower ends thereof for effecting a flow of air bubbles through said open upper ends toward an upper surface of water within the aquarium tank; and
(g) filter means receiving drain water and debris from the lower water receiving compartment for removing debris therefrom and for returning filtered water to the aquarium tank.

3. In an aquarium as set forth in Claim 2 wherein said filter means includes:
(a) at least one valve controlled flow member communicating with the lower water receiving compartment in spaced relation to said end, front and rear walls for flow of drain water and debris therefrom;
(b) a filter device having communication with said valve controlled flow member and capable of removing debris from aquarium water;
(c) pump means mounted on said filter device and having said valve controlled flow member connected thereto for moving water and debris through said filter device; and
(d) a flow member connected to said filter device and having a discharge end positioned to direct filtered water to the upper surface of water within the aquarium tank.

* * * * *